(12) United States Patent
DeWakar et al.

(10) Patent No.: US 9,349,124 B2
(45) Date of Patent: May 24, 2016

(54) INTEGRATED SYSTEM AND METHOD FOR ENABLING MOBILE COMMERCE TRANSACTIONS USING ACTIVE POSTERS AND CONTACTLESS IDENTITY MODULES

(75) Inventors: Sunny Ramaswamy DeWakar, Alexandria, VA (US); Kishor Dynandeo Narkhede, Andhra Pradesh (IN); Parveen Kumar Chaudhary, Delhi (IN); Kevin Bresnahan, Middleton, MA (US)

(73) Assignee: Xius Corp., North Chelmsford, MA (US)

( * ) Notice: Subject to any disclaimer, the term of this patent is extended or adjusted under 35 U.S.C. 154(b) by 14 days.

(21) Appl. No.: 12/899,714

(22) Filed: Oct. 7, 2010

(65) Prior Publication Data
US 2011/0202417 A1  Aug. 18, 2011

Related U.S. Application Data

(63) Continuation-in-part of application No. 12/705,696, filed on Feb. 15, 2010, now Pat. No. 9,092,772.

(51) Int. Cl.
| | |
|---|---|
| *H04W 4/00* | (2009.01) |
| *G06Q 20/32* | (2012.01) |
| *G06Q 20/10* | (2012.01) |
| *G06Q 20/20* | (2012.01) |
| *G06Q 30/06* | (2012.01) |

(52) U.S. Cl.
CPC .......... *G06Q 20/3278* (2013.01); *G06Q 20/102* (2013.01); *G06Q 20/105* (2013.01); *G06Q 20/202* (2013.01); *G06Q 20/32* (2013.01); *G06Q 20/3223* (2013.01); *G06Q 30/0601* (2013.01)

(58) Field of Classification Search
CPC ..................................................... H04W 4/008
USPC .......... 455/41.1, 41.2, 41.3, 410, 50.1, 556.1, 455/556.2, 90.1–3; 705/14
See application file for complete search history.

(56) References Cited

U.S. PATENT DOCUMENTS

| | | | |
|---|---|---|---|
| 7,155,199 B2 * | 12/2006 | Zalewski et al. ............... 455/403 |
| 2005/0160003 A1 * | 7/2005 | Berardi et al. .................. 705/14 |
| 2007/0022058 A1 * | 1/2007 | Labrou et al. ................... 705/67 |
| 2007/0203850 A1 * | 8/2007 | Singh et al. ..................... 705/67 |
| 2008/0319896 A1 * | 12/2008 | Carlson ................. G06Q 20/02 705/38 |
| 2009/0070171 A1 * | 3/2009 | Patterson .......................... 705/7 |
| 2009/0098825 A1 * | 4/2009 | Huomo et al. ............... 455/41.1 |
| 2009/0157512 A1 * | 6/2009 | King ............................... 705/14 |
| 2010/0075666 A1 * | 3/2010 | Garner ....................... 455/426.1 |

* cited by examiner

*Primary Examiner* — Wen Huang
(74) *Attorney, Agent, or Firm* — IPCL Group PLC; Anthony Tacconi

(57) ABSTRACT

A method, integrated system and Active Poster for processing mobile touch transactions. The integration consists of an RFID or other near field communication enabled device which may be standalone, affixed to, or part of a mobile or hand held portable wireless communication device (optionally using a Contact Less (CL) SIM with near field communication capability), a touch sensitive Active Poster also with near field communication capability, an issuer's or mobile network provider's system and application and a host computer with networking capability.

5 Claims, 6 Drawing Sheets

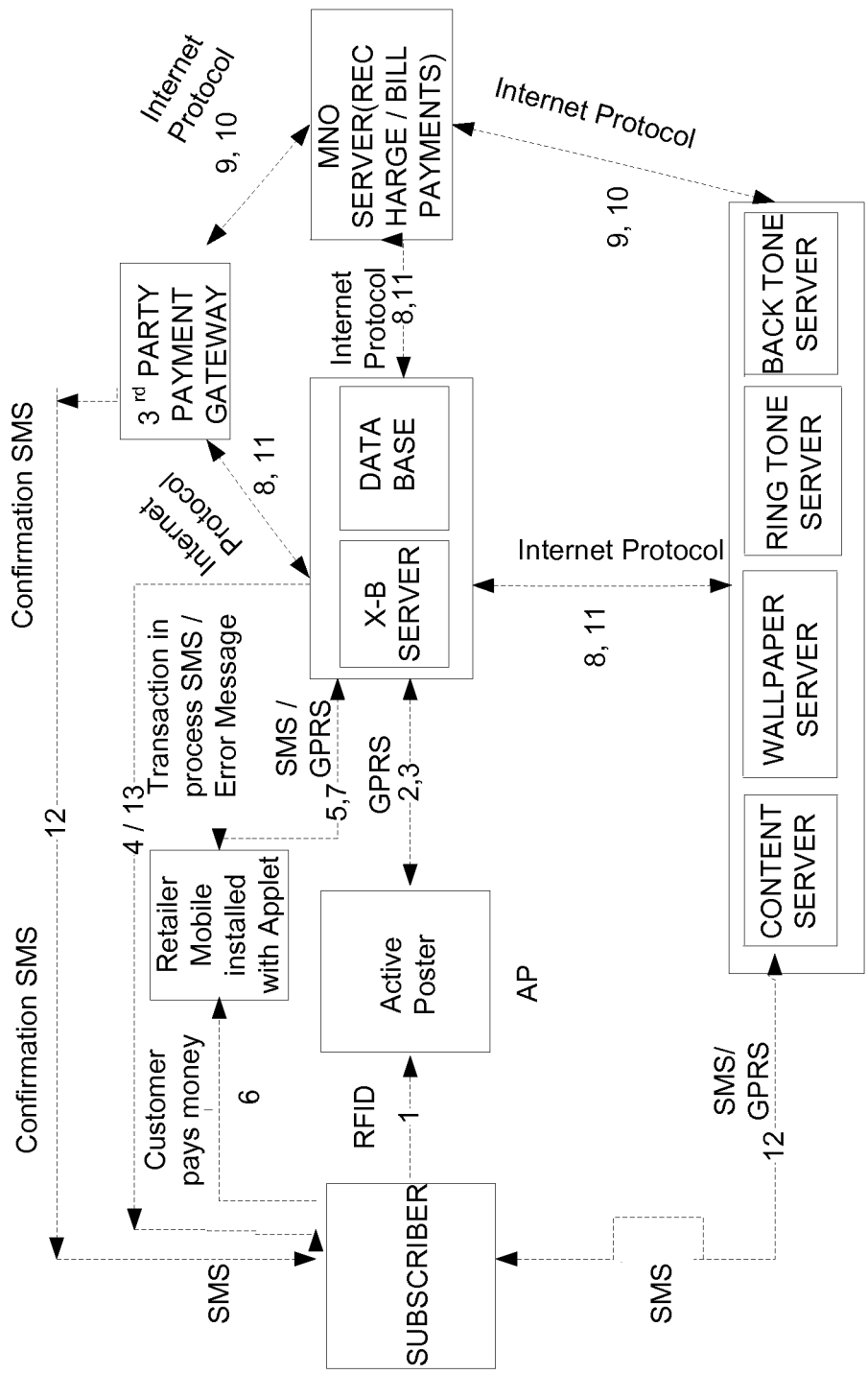

USOO9349124B2

INTEGRATED SYSTEM AND METHOD FOR ENABLING MOBILE COMMERCE TRANSACTIONS USING ACTIVE POSTERS AND CONTACTLESS IDENTITY MODULES

1. CROSS-REFERENCE TO RELATED APPLICATIONS

This application is a Continuation in Part (CIP) of U.S. Non-Provisional patent application Ser. No. 12/705,696, filed on Feb. 15, 2010 (the "'696 application"), which is hereby incorporated by reference in its entirety for all purposes.

2. FIELD OF INVENTION

The present invention relates to a method, integrated system and active poster for efficient management of mobile touch transactions. More particularly, disclosed is a method, integrated system and active poster for electronic payment systems using portable contactless identity modules to trigger an application carried out by a proximate active poster in order to select one or more services and carry out a mobile commerce transaction.

3. DEFINITIONS, ABBREVIATIONS AND ACRONYMS

Active Poster. A 'touch-n-display unit' that enables mobile subscribers with CL SIMs or other types of RFID units in their handsets or (in the case of standalone RFID units) carried separately, to conduct mobile transactions like prepaid recharge, bill payment, etc.

Host Computer. The computer system including a backend database and server which contains the UID (device IDs of the FRID units), and corresponding information to identify the corresponding MNO subscriber account and other logic to enable the mobile commerce functions described.

RFID, Radio Frequency Identification Device. A smart card, wafer, contactless SIM or other device incorporating RFID technology and which is able to transmit its RFID device ID (Unit ID or UID) via near field communication means. The present invention can also be implemented with any suitable near field communication enabled device in place of an RFID, so long as the device transmits a device identifier via near field communication capability.

RFID Reader. Device on the Active Poster which reads the UID of the RFID and transmits the UID to additional components within the AP.

Unit ID or UID. The unique identification code transmitted by and associated with the RFID.

| Acronym | Meaning |
| --- | --- |
| AP | Active Poster |
| CL SIM | Contactless SIM |
| DDA | Direct Debit to Account in a bank |
| EFT | Electronic Funds Transfer |
| MNO | Mobile Network Operator |
| NFC | Near Field Communication |
| RF | Radio Frequency |
| RFID | Radio Frequency Identification Device |
| PCB | Printed Circuit Board |
| SIM | Subscriber Identity Module |

4. BACKGROUND OF THE INVENTION

In conventional smart card systems, Card Issuers such Banks/FIs, Mass Rapid Transit (MRT) Companies, Loyalty Companies have access to the cards only when the cardholder presents the card to a card reader/terminal which is connected to the issuers' backend systems via a communication network.

This condition limits the card issuer's ability to offer new services such as a time bound promotions or value based discounts to enhance customer loyalty only when a cardholder presents the card to the terminal.

This also restricts the issuer's capability to block a card or a specific service on a card in case of defaults, card is stolen/lost, compromised security, etc., increasing the risks or liability of misuse till such time as the card is presented to a terminal connected to the issuer network.

The mobile networks have high penetration coupled with ease of use, with demand for new services. With increasing development in infrastructure, the RFID modules used in conjunction with active posters present several advantages. The RFID units are inexpensive and can be adhered to MNO subscribers' mobile phones or carried separately. The same functions can also be availed by customers of other types of companies such as transit systems. The functionality enabled by the RFIDs is easy to use with a high level of convenience. The MNO or other issuer's demand for fast and efficient management of accessibility of means with which to transact mobile commerce transactions has steadily increased with the wide-spread utilization of wireless network communication for processing various customer sales, transactions and other services.

Accordingly, the '696 application invention addressed a more efficient and productive manner of achieving the said advantages through the integration of RFID enabled smart cards with SIM cards of mobile devices. A CL SIM/(U) SIM/R-UIM with an existing CL card controller is attached with an antenna interfaced with an existing SIM/(U)SIM/R-UIM controller (dual chip architecture). A CL interface uses a specially designed antenna which is provided to a partitioned, dedicated memory of a SIM controller (single chip architecture). Both the above configurations can be inserted in to existing handsets with a SIM/(U)SIM/R-UIM card connector. With a CL SIM the card issuer's applications residing on conventional smart cards can be loaded unchanged in the separate, dedicated memory of a CL controller or SIM with CL interface. Besides savings in card issuance and maintenance cost, the issuers can securely access (using their own secret keys) their applications on the CL SIM through the mobile network connectivity provided by the SIM. Similarly, it also offers several tangible benefits to mobiles users who also happen to be card holders. Cardholders can view history, updates, etc. on their own personal, trusted device—their mobile phone. The CL SIM Cards can be provisioned with EMV credit/debit soft cards over-the-air (OTA) and hence, mobile users can use their CL SIM/(U)SIM\R-UIM in handsets for payments at existing contactless card acceptance devices (POS terminals) or legacy POS devices with plug-n-play contactless adapters.

The transaction processing & settlement of all card transactions at POS locations requires live network connectivity for these terminals. With CL SIM/(U) SIM/R-UIM in cardholder's handsets, the transaction processing and settlement of these transactions can be routed through mobile user's handset using an appropriate wireless bearer. The distinct advantage of this method over the prior process is the functionality where the user's handset triggers the wireless transport bearer, and hence can be utilized in remotest locations, where a POS terminal cannot be used in absence of a telephone line (live network connectivity). The Mobile Touch Transaction disclosed in the '696 application also enhances the operational efficiency of Mobile Network Operators revenue system.

Since filing the '696 application new technological advances within RFID cards have allowed for the ability to be MiFare enabled with NFC security and other capabilities. In the embodiments described in '696 application the Active Poster and a handset with CL-SIM were required to communicate to the Host Computer. The present application describers additional embodiments which were enabled and taught in the '696 application. In these additional embodiments, the RFID triggers all CL-SIM applications without the dependence of a handset for communication back to the Host Computer. This improvement allows for the invention to be utilized by a broader audience and without the need to install NFC enable SIMs in the subscribers' mobile handsets.

5. SUMMARY OF THE INVENTION

To overcome the aforementioned problems, the present invention proposes a method, integrated system and Active Poster for processing mobile touch transactions. The integration consists of an RFID device which may be standalone, affixed to, or part of a mobile or hand held portable wireless communication device (optionally using a Contact Less (CL) SIM) with near field communication capability, an Active Poster with near field communication capability and an issuer's or mobile network provider's application and a Host Computer with networking capability.

A mobile subscriber using an RFID, or mobile or hand held portable wireless communication device with CL SIM, simply touches the Active Poster and initiates a business transaction. It is accomplished by using NFC (near field communications) to transmit RFID device ID information (the UID) to the Active Poster. The secure UID is associated with the subscriber's account identifying information with the MNO or other service provider. The secure UID, combined with the content and functionality of the Active Poster, generates a unique service offering that will be initiated and orchestrated by the Host Computer. The subscriber or other user of the RFID manually selects a mobile commerce transaction by pressing a button on the Active Poster. The Active Poster communicates the selection of the mobile commerce transaction to the Host Computer through the telecommunications network. The Host Computer if necessary communicates via telecommunications network to the MNO, payment gateways, mobile commerce product gateways, or other network elements, which may in turn communicate with the subscriber's mobile phone or other handheld wireless communication device to complete or otherwise in connection with the mobile commerce transaction.

6. BRIEF DESCRIPTION OF THE DRAWINGS

The present invention is illustrated with accompanying figures, which are given to illustrate an embodiment of the present invention. These are not intended to be taken restrictively to imply any limitation on the scope of the present invention.

FIG. 6 is a diagram for all enabled transactions using a process flow and network view.

7. DETAILED DESCRIPTION OF THE INVENTION

Figure 1:
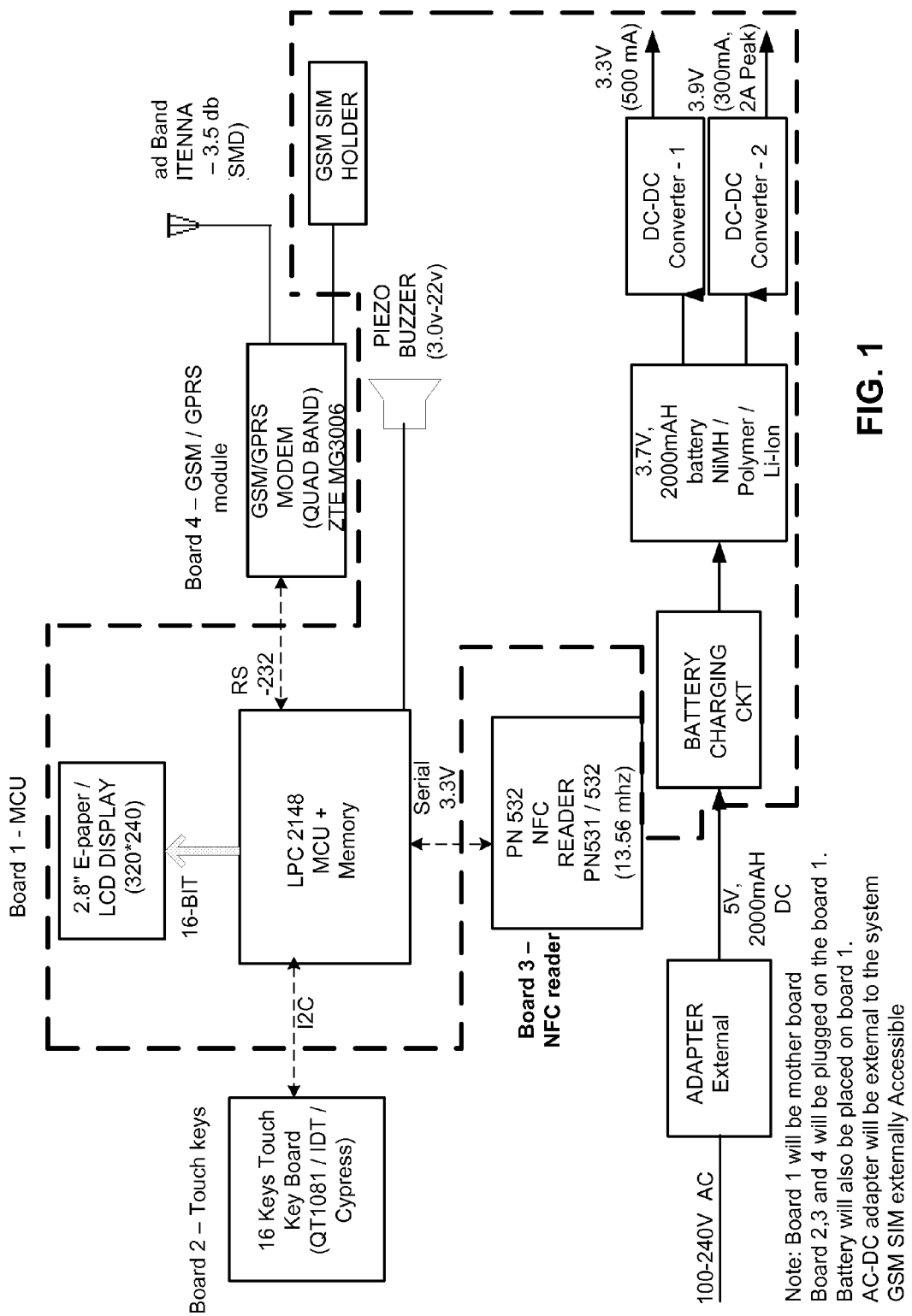
FIG. 1 shows a block diagram of the Active Poster circuit layout.

Exploration of two unique but unrelated technologies—RFID and Touch Sensing—to enable Near Field Communication features in millions of existing mobile handsets, led to the development of this unique mobile touch transaction platform. The easy-to-use, simple and intuitive touch interface simplifies and speeds up day-to-day mobile transactions and is an ideal replacement for RFID enabled smart cards or other formats, being used for different applications presently.

One embodiment utilizes the RFID capabilities of such CL-SIM-equipped mobile handsets without the need for specialized applications in said mobile handsets, apart from the basic ability of the RFID in said mobile handset to generate a UID. Alternatively, the RFID capability can be provided by a standalone RFID unit such as an RFID wafer, or card enabled with RFID capability, any of the foregoing with the ability to transmit the UID via NFC. The UID is associated with the subscriber or other user's account with an MNO or other service provider.

When the RFID is physically affixed to the subscriber's mobile handset, or where the UID is associated with the subscriber's account with the MNO, the invention offers the MNOs the ability to have the control of ancillary services for telecom and non-telecom applications, as they see it as a new revenue stream opportunity.

It offers the choice of different business models such as:
Hosting, referral, transaction fees
Increased stickiness
Additional data traffic revenues
It also minimizes the infrastructure requirement and costs as the RFID units are generally inexpensive.

The method and integration of carrying on the transaction of the above invention is given below:
Description of the RFID.

RFID chips used with these embodiments are available commercially. Typical specifications include compliance with ISO/IEC 14443-A radio frequency standard, and operations at 13.56 Mhz (HF) carrier frequency. The available RFIDs incorporate security features including dynamically generated variations enabling a challenge-response scheme between the RFID and the reader. This makes the RFID's effectively "unclonable."

The RFID is issued to the subscriber or other service customer by the MNO or other provider, and a concordance between the UID and the subscriber's account with the MNO or other services provider is maintained by the Host Computer.

Description of the Active Poster.
Components.

Yet another embodiment of the invention is Active Poster (AP): a 'touch-n-display unit' is a terminal device where subscribers with RFID units can visit any Active Poster device location to carry out a transaction for any telecom or non-telecom application they have registered for and activated by their MNO or other service provider. The Active Poster in a typical deployment is made up of a thin, lightweight touch enabled 6"/8"/9.7"/10" sized e-Paper, display or slim touch screen LCD display (or e-paper) printed RFID antenna and short range radio module encapsulated in a PET polymer substrate, to resemble a single poster.

FIG. 1 shows a block diagram of the Active Poster circuit layout.

The Active Poster includes the following components:

NFC Reader. The NFC Reader acts as a medium that receives the UID from the subscriber when the RFID/NFC equipped card, wafer, enabled handset or other mobile device is brought near the Active Poster. The NFC Reader sends it to the Micro-Controller through RS232.

GSM/GPRS Modem. This modem is used to communicate between the Active Poster and the Host Computer back end over Short Message Service (SMS), GPRS, GSM, CDMA or other suitable method. The SMS (or other message as indicated in the prior sentence) from the Active Poster is recognized at the Host Computer and respective key actions are initiated to complete the transaction.

Micro-Controller. The Micro Controller LPC 2148 is the heart of the Active Poster unit. It is a micro controller having 16/32 bit operation in a typical deployment. The micro controller controls and integrates all peripheral devices like the NFC reader, GSM/GPRS modem, and touch controller chip.

Touch Panel. The Touch Panel mainly contains keys which are used to select the value added services provided by the MNO or other service provider. In a typical deployment 3 may be used for prepaid recharge, one for the caller ring back tune and one for post paid bill payment and three for other custom value added services specific to the MNO or other service provider. In addition alpha numeric entry and scrolling for menu items on the display is enabled using the touch panel keys. Methods for selecting menu items include generating a list of options by pressing a designated function key (such as a key labeled ring tones), and then selecting the desired numbered option by pressing the corresponding number key.

Touch keys are sensed by a touch controller such as a model QT1081 from Atmel. Touch keys are provided on PCB board (FR4 material) and the synthetic printed poster is applied with adhesive over the keys. When the user touches the synthetic printed poster at a key position, the sensor chip senses the touch and micro controller recognizes the key touch.

Buzzer. A buzzer or beeper is an audio indication for the user to know the status of an action performed. For example when a key is pressed, the beeper provides an audio indication. When the mobile phone is tapped, a beep may provide acknowledgement of NFC reading initiation, and/or completion.

LED Indicators. Light Emitting Diode (LED) indicators are provided in order to display the status of a transaction during the interaction with the Active Poster by the user. It may be a dual colored LED which indicates various patterns based on transaction state.

Power Supply. A 5V DC external adapter powers the Active Poster. It supplies the power to all of the devices on the board. The 5V DC adapter has universal input operational from 100-240V AC.

Unit Construction. The Active Poster unit may be built using a 13"×19" Acrylic sheet (transparent). The electronics (controller PCB board, NFC Reader, GSM Modem and Buzzer) are placed at the back side of the acrylic sheet. This electronics arrangement is interconnected as per FIG. 1. The electronics assembly is covered with a casing of Acrylic. The screen of the Active Poster is printed on synthetic paper for example having a size of 13"×19" and it may be applied with adhesive to the Active Poster. The power connector and antenna connector are provided on the acrylic back casing so that the external connectivity can be provided. The Active Poster has a provision for attaching the unit on a wall using for example stainless steel studs.

Specifications.

The specifications for the components of the Active Poster are further described as follows:

Microcontroller (Illustrative Specifications)

ARM7 (NXP-LPC2148) @ 12 MHz, 32-bit NFC Reader Module—APDA

Communication protocol—ARYGON (HL—high level language)

Operational Frequency—13.56 MHz

Interface—UART (CMOS-TTL), I2C or RS232

Power supply—+3.3 VDC . . . +5VDC3

Power consumption—Aprox. 95 mA

Antenna Integrated

Reading distance Up to 45 mm/1.77 Inch (passive and RFID as well)/70 mm/2.76 Inch (active)

Dimension (L×W×H) 59×32×2, 5 mm/2.32×1.26×0.098 Inch

Operating temperature: −20° C. to +80° C./−4 F to 176 F

Storage temperature: −40° C. to +85° C./−40 F to 185 F

Touch Panel Interface (Illustrative Specifications)

QT1081 (Touch Panel Controller)

Technology used is spread-spectrum is patented spread-spectrum charge-transfer.

Electrode materials used are copper, silver, carbon, etc.,

Panel materials can be plastic glass, composites, patented surfaces (low particle density metallic paints possible).

Panel thickness up to 50 mm glass, 20 mm plastic (key size dependent).

Key sensitivity settable via change in reference capacitor value.

Power consumption 2.8v~5.0v<15 QA (8 keys at 2.8v, 340 ms low power mode).

Package 32-pin 5×5 mm 'RoHS compliant

Signal processing self-calibration, auto drift compensation, noise filtering, patented Adjacent Key Suppression.

Circuit Description (Illustrative):

LPC 2148 is the Micro Controller (ARM 7). It is a 32-bit Microcontroller with 512 KB on-chip Flash ROM and 32 KB RAM. It works on a crystal frequency of 12 MHz. The controller gets the UID from the NFC Reader over a serial link and the key input from the user through the touch panel and performs the respective functionality. LPC2148 is used for AP module where higher end processors like ARM9 are needed to handle high graphics, video format display.

The NFC Module, which reads the UID, is connected to the UART0 of the Micro-Controller.

The QT1081 is an improved, lower cost, simplified circuit version of the popular QT1080 sensor IC. The QT1081 is designed for low cost appliance, mobile, and consumer electronics applications. This controller senses the key touched and send the key to the microcontroller.

The MAX3232 device consists of two line drivers, two line receivers, and a dual charge-pump circuit (serial-port connection pins, including GND). The device meets the requirements of TIA/EIA-232-F and provides the electrical interface between an asynchronous communication controller and the serial-port connector.

The operating voltage range of LPC 2148 is 3.0V to 3.6V (3.3 V±10%) with

5 V tolerant I/O pads and the operating voltage range of QT1081 is 2.8V to 5.0V.

It can be mounted behind a shop's front glass, walls or partitions or be placed on a desktop/tabletop. A separate 'base unit' with a thin, lightweight touch enabled 6"/8"/10" e-Paper, printed RFID antenna and short range radio module encapsulated in a PET polymer substrate, to resemble a single poster. It can be mounted behind a shop's front glass, walls or partitions or be placed on a desktop/tabletop. A separate 'base unit' approximately the size of a desktop calculator with 'soft keys' and a small 1-line×8 characters e-Paper display, for the Retail Counter to enter and view the amount received for cash transactions.

Description of the Optional RF Pin-Pad.

The RF pin-pad contains soft keys (touch buttons) to authorize cash transactions. It has first three buttons of different denomination in local currencies which correspond to prepaid recharge. The RF pin-pad also has three LEDs, red, yellow and green indicating status of the transactions.

The RF pin-pad interacts with the AP via RF link within a range of 10 meters and serves as a remote AP terminal.

Illustrative Process Flow (Hardware Based Perspective).

The way mobile commerce transactions are done using the Active Poster, from a hardware and signaling perspective, is illustrated as follows:

a) The user touches the RFID device (for example RFID wafer, Smart Card or CL-Sim enabled wireless hand held device) near a "mobile icon" on the Active Poster which indicates the target location in order to initiate RFID communications.
b) A beep sound is heard and the LED glows indicating the activation of the Active Poster.
c) The Antenna (below/underneath the mobile icon) triggers the NFC controller.
d) The NFC controller computes its challenge key using its secret key.
e) NFC controller sends challenge to the RFID device (for example RFID wafer, Smart Card or CL-SIM enabled wireless hand held device).
f) There is a process of Identification and mutual authentication (3-DES/AES). If the authentication is successful the NFC controller sends the UID to the Microprocessor and the Microcontroller powers up the Touch Controller.
g) If the authentication fails then the NFC controller has to again compute its challenge key using its secret key.
h) The Microprocessor sends the UID is send to the Host Computer via the GPRS device.
i) The Host Computer authenticates the subscriber via the UID and MDN. The Host Computer sends the results (pass/fail) to the Microcontroller via the GPRS using the telecommunications network.
j) The Microprocessor then sends the results to the AP display.
k) If the authentication fails meaning the RFID is not registered, then the subscriber can activate as a new user at the Active Poster.
l)) Once the Touch Controller is active the user touches the Touch Panel key(s) to select the desired transaction.
i) Beep is heard and LED glows.
j) The Touch Controller gives the key code (information as to which keys have been pressed on the Touch Panel) to the Microcontroller.
k) The Microcontroller passes the data to the NFC Controller, OR, passes the data to the back end server of the Host Computer via the GPRS device using the telecommunications network.
l) The subscriber touches the enter key and then again touches the Start/Confirm button (NFC controller) with the RFID enabled device.
m) The NFC controller writes data to the CL SIM, CL SIM passes transaction data to the handset and Handset transfers the data to the back end server, OR, the NFC controller triggers the microprocessor which sends the UID and selection to the back end server via the GPRS device using the telecommunications network.

The unit can be an onboard wireless module (CDMA/GSM/GPRS/Wi-Fi) to download and store the ad/promotional material, content, firmware updates, etc from a remote server (content repository and/or CTMS) hosted at a datacenter or any other service provider. The downloaded content will be transferred over the aforementioned telecommunication network to the 'touch-n-display unit'. This onboard wireless module also can be used for user data authentication Description of Enabled Functionality.

One mode of working the invention is demonstrated by the process followed in the following description.

a). Prepaid or Postpaid Recharge (or Other Payment to Utility Account, etc.) Using a Retailer to Accept Payment.

Figure 2:
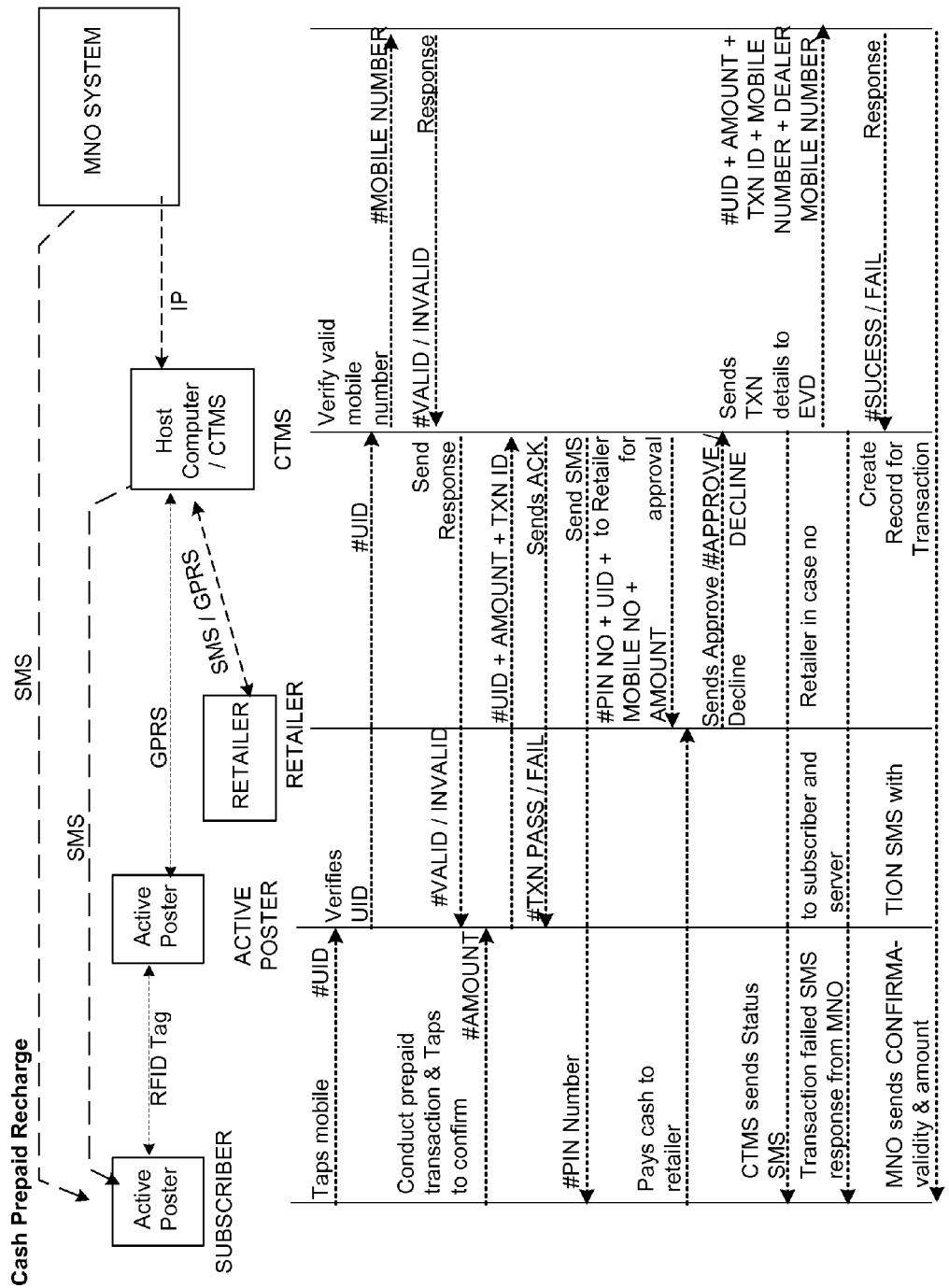
FIG. 2 is a flow diagram of an illustrative use case: recharge of or payment to prepaid or postpaid MNO account, with retailer cooperation.

In FIG. 2, the subscriber taps (or otherwise brings into close proximity) his or her RFID unit, such as an RFID wafer either carried separately or adhered for convenience onto the outside of his or her mobile phone. The Device ID of the RFID (UID) unit is associated with the subscriber's MNO or other service provider account ID (for example the subscriber's mobile number, also known as a mobile directory number, or MDN).

In the following discussion, such MNO or other service provider is referred to as the MNO, however it is understood it could be any prepaid or postpaid wireless provider or any other type of service provider which bills its subscribers and maintains a prepaid or postpaid account in connection with its user or subscriber. Examples include but are not limited to telephone companies and other utilities. Similarly, the account number with the MNO is referred to as the MDN, but it could be any type of account number which is associated with the subscriber (or other user's) established credit or debit balance.

In order to make the association, the subscriber has previously enrolled in the feature or plan supporting the use of the Active Poster and has been previously issued his or her RFID unit.

The AP sends a request to the Host Computer to verify the UID. The Host Computer has a concordance table relating UIDs to valid MNO or other service provider account identifiers (such as MDN). The Host Computer sends a request to verify the MDN to the MNO provider billing system. The service provider providing the Active Poster functionality is either the MNO itself or is in a business relationship with the MNO so that the MNO can periodically refresh the Host Computer concordance table. The MNO system responds.

In the following it is assumed that the response is that the MDN is valid. The MNO system responds to the Host Computer that the MDN is valid. The Host Computer responds with the result to the AP. The AP instructions prompt the subscriber to select a transaction, for example account payment (for example prepaid account recharge or postpaid account payment). The subscriber selects a transaction (for example $30 recharge amount) by pressing a button on the AP.

The AP has been printed with different buttons corresponding to different recharge amounts. Alternatively, the AP can be a touch sensitive computer screen and instructions for identifying available transactions can be periodically uploaded from the Host Computer.

The subscriber again taps (brings into close proximity) his or her RFID unit to the AP. The AP transmits the UID (gained as a result of the tap, via NFC), the transaction amount, and a unique transaction ID generated by the AP logic, to the Host Computer. The transaction ID is registered with the Host Computer as being associated with the transaction selected at the AP.

The Host Computer sends an acknowledgement back to the AP, and the AP is triggered to tell the subscriber that the transaction is in process. In the foregoing steps the AP has been synchronously processing a single transaction. Once the acknowledgment is received by the AP, the AP is free to engage in a subsequent transaction.

The Host Computer then sends an SMS message to the subscriber's MDN with a unique PIN number. Alternatively, the AP can receive the PIN from the Host Computer which would be printed by the AP using a suitable simple printer attached to the AP. In either case, the Host computer also sends to the retailer's mobile handset, via SMS (or GPRS mobile data session, or regular internet via desktop or laptop computer, or other convenient method as known in the art) the same PIN, plus information including the UID, the subscriber's MDN and the transaction amount.

The subscriber can, at some point (for example after completing shopping within the store at which the AP may be located) pay the retailer (cash or other agreed-upon vehicle such as credit/debit card), for the amount of the pending transaction. The subscriber provides the retailer with the PIN he or she has received. The retailer verifies against the PIN and amount that the retailer has received in connection with the same transaction.

The retailer (in this example) approves the message by replying to the SMS (or via one of the alternate transmission methods set forth immediately above), thus sending an approval message with at least the PIN and an approval code.

The receipt of the SMS by the retailer, and the reply to the SMS by the Retailer, can be facilitated using a straightforward "retailer applet" which is provided with the Active Poster system (and has been previously delivered and loaded to the retailer's mobile device). The retailer applet receives the SMS from the Host Computer and formats it in a way that makes selection and identification of the subscriber's transaction simple. The retailer applet also is designed to be a fast and convenient way for the retailer to respond to multiple sequential transactions quickly. Once the retailer has approved a transaction (and collected the money from the subscriber) the retailer will trigger the retailer applet to send a formatted SMS to the Host Computer to complete the subscriber's transaction. The foregoing functionality can be simply coded by any software developer versed in the art.

The Host Computer sends a status SMS message to the subscriber's mobile handset, indicating that the transaction is in process. The Host Computer also sends a request (for example via TCP/IP network connection or other suitable networking protocol) to the MNO billing system to complete the transaction (for example apply a dollar amount equal to the requested recharge or payment purchase amount to the subscriber's account with the MNO). Included in the request are the UID, transaction ID (for later reconciliation between MNO and Host Computer records if needed), MDN, and an identification number sufficient to identify the retailer with the MNO's records (for the MNO's recordkeeping and tracking purposes).

The MNO responds that a validly formatted request has been successfully received, back to the Host Computer. The MNO sends a confirmation SMS back to the subscriber's mobile handset that the requested transaction has been performed.

b) Mobile Commerce Transaction Using Debit to Prepaid or Postpaid Account as Payment.

Figure 3:
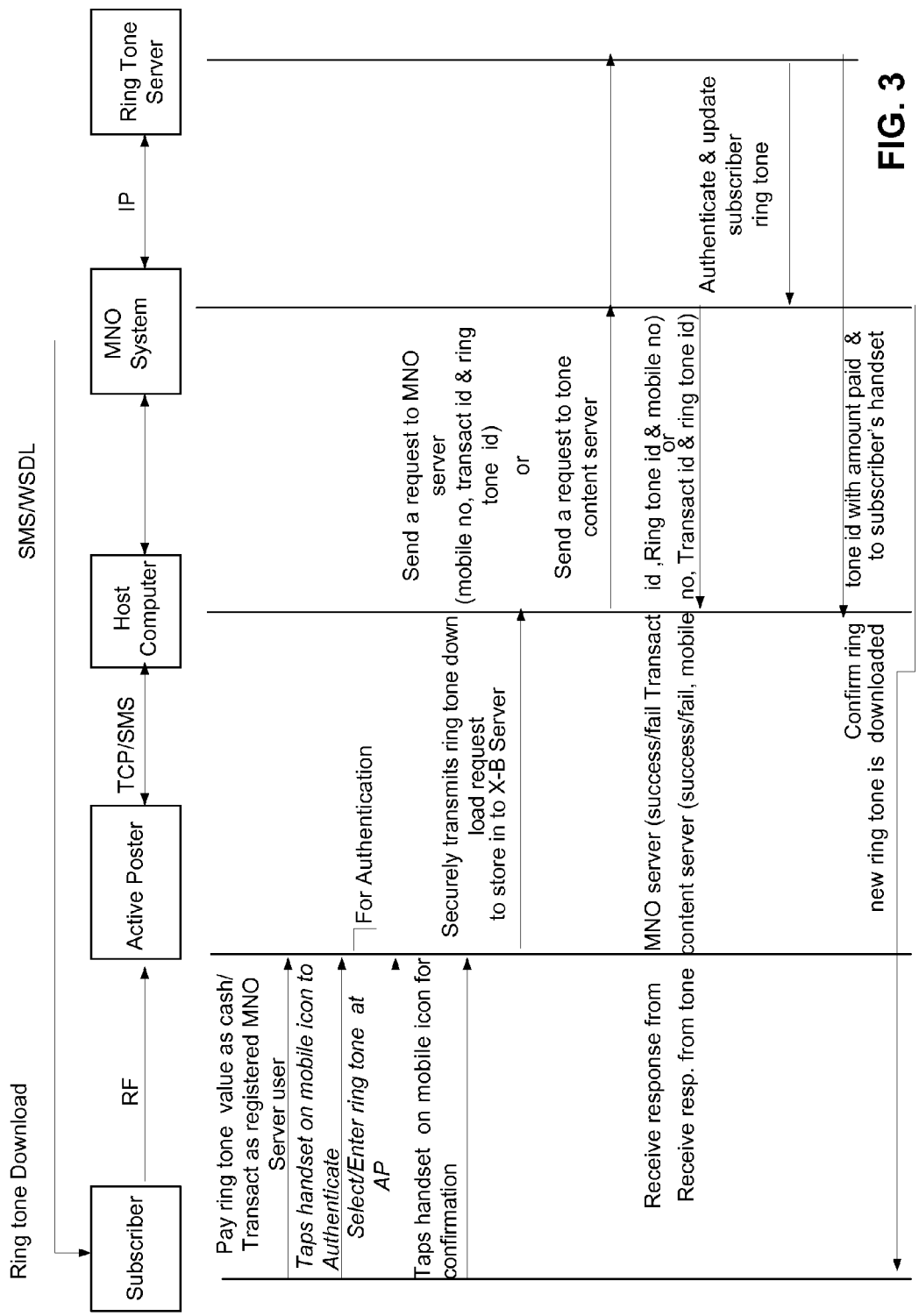
FIG. 3 is a flow diagram of an illustrative use case: mobile commerce transaction such as ring tone or other mobile content purchase and delivery, using debit to subscriber's prepaid or postpaid balance as payment.

In FIG. 3, the subscriber taps (or otherwise brings into close proximity) his or her RFID unit, such as an RFID wafer either carried separately or adhered for convenience onto the outside of his or her mobile phone. The UID of the RFID is associated with the subscriber's MNO or other service provider account ID (for example the subscriber's mobile number, also known as a mobile directory number, or MDN).

In the following discussion, such MNO or other service provider is referred to as the MNO, however it is understood it could be any prepaid or postpaid wireless provider or any other type of service provider which bills its subscribers and maintains a prepaid or postpaid account in connection with such subscriber. Examples include but are not limited to telephone companies and other utilities. Similarly, the account number with the MNO is referred to as the MDN but it could be any type of account number which is associated with the subscriber (or other user's) established credit or debit balance.

In order to make the association, the subscriber has previously enrolled in the feature or plan supporting the use of the Active Poster and has been previously issued his or her RFID unit.

The AP sends a request to the Host Computer to verify the UID. The Host Computer has a concordance table relating RFIDs to valid MNO or other service provider account identifiers (such as MDN). The Host Computer sends a request to verify the MDN to the MNO system. The service provider providing the Active Poster functionality is either the MNO itself or is in a business relationship with the MNO so that the MNO can periodically refresh the Host Computer concordance table. The MNO system responds.

In the following it is assumed that the response is that the MDN is valid. The MNO system responds to the Host Computer that the MDN is valid. The Host Computer responds with the result to the AP. The AP instructions prompt the subscriber to select a transaction, for example ring tone purchase. The subscriber selects a transaction (for example ring tone purchase) by pressing a button on the AP. The AP has been printed with different buttons corresponding to different ring tones, and menus may be further employed tom allow for a variety of mobile content such as ring tones. Alternatively, the AP can be a touch sensitive computer screen and instructions for identifying available transactions can be periodically uploaded from the Host Computer.

The subscriber again taps (brings into close proximity) his or her RFID unit to the AP. The AP transmits the UID (gained as a result of the tap, via NFC), the transaction amount, and a unique transaction ID generated by the AP logic, to the Host Computer.

The Host Computer sends an acknowledgement back to the AP, and the AP is triggered to tell the subscriber that the transaction is in process. In the foregoing steps the AP has been synchronously processing a single transaction. Once the acknowledgment is received by the AP, the AP is free to engage in a subsequent transaction.

The Host Computer sends a status SMS message to the subscriber's mobile handset, indicating that the transaction is in process. The Host Computer also sends a request (for example via TCP/IP network connection or other suitable networking protocol) to the MNO system to complete the transaction (for example purchase a ring tone against the subscriber stored value account or post paid account with purchase amount applied against the subscriber's account with the MNO). Included in the request are the UID, transaction ID (for later reconciliation between MNO and Host Computer records if needed), MDN, and an identification number sufficient to identify the retailer with the MNO's records (for the MNO's record keeping and tracking purposes).

The MNO responds back that a validly formatted request has been successfully received, back to the Host Computer. The MNO sends a confirmation SMS that the requested transaction has been performed, along with the requested content (ring tone), back to the subscriber's mobile handset.

c) New AP User Registration; Daily AP Activation/Deactivation.

Figure 4:
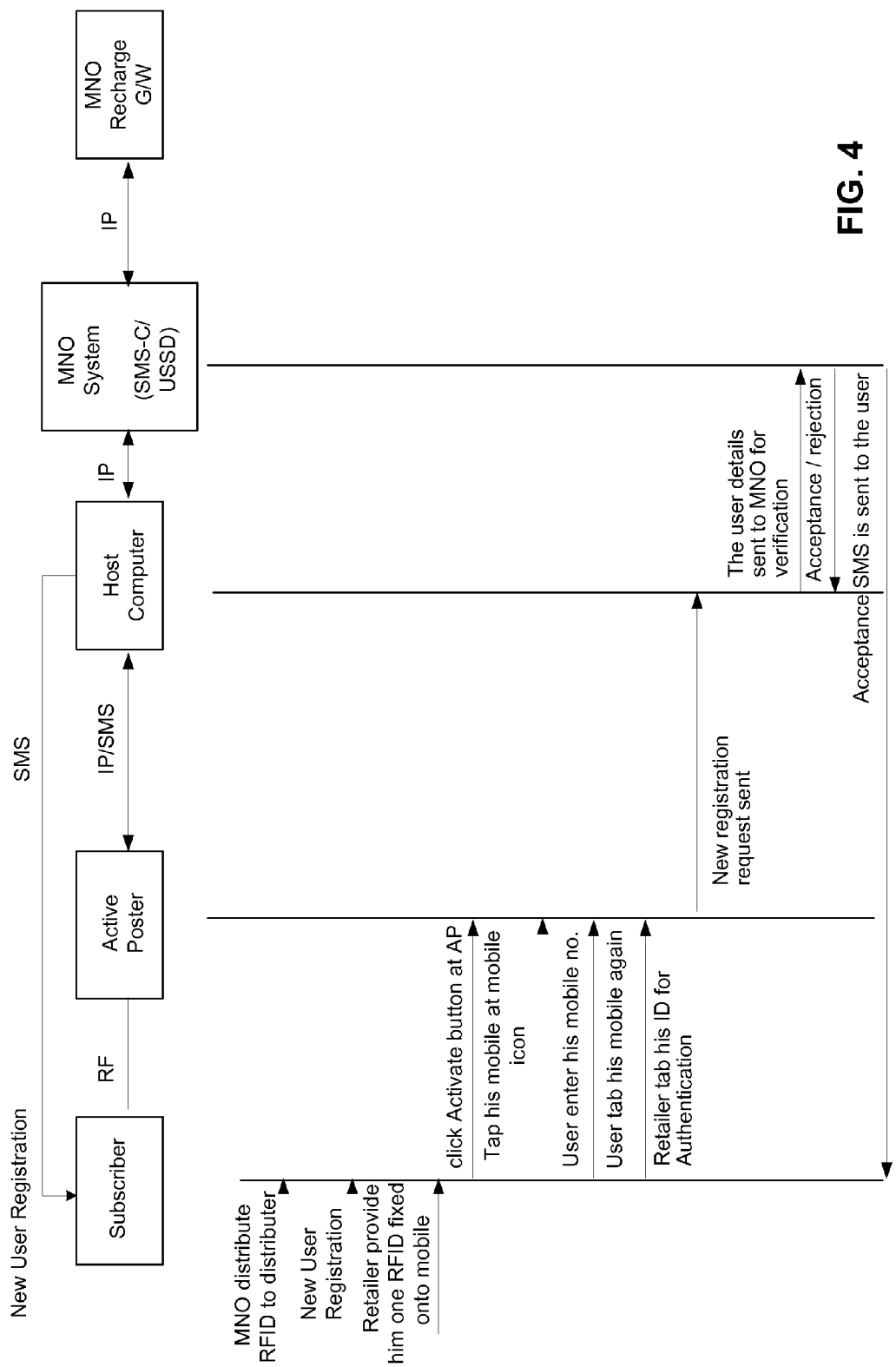
FIG. 4 is a flow diagram showing new user registration using the AP.

FIG. 4 shows New User Registration. The retailer can assist in registering a new subscriber so that that the subscriber can use the AP. The retailer may be issued RFID units, for example wafers able to be affixed to a subscriber's mobile handset. The subscriber will previously have established a standard mobile prepaid or postpaid account with the MNO.

The new subscriber and the retailer approach the AP, and one of them activates the registration module on the AP, for example by pressing a button so designated on the AP. The user taps (or otherwise brings the RFID into close proximity) in order to transfer the UID to the AP via NFC. The AP transfers the UID to the Host Computer to validate that the RFID is not already associated with another MDN. The Host Computer validates that that RFID is new and then the user then enters his or her MDN by pressing the numerical keypad buttons on the AP. The retailer likewise enters his or her retailer ID (which the retailer has previously received from the MNO or AP system provider).

The AP sends this information to the Host Computer. The Host Computer sends the request with this information to the MNO system. The MNO system sends back an acknowledgement to the Host Computer, and via SMS, sends a separate acknowledgement back to the subscriber's mobile handset. The UID is now associated with the MDN of the subscriber in the Host Computer as well as the MNO's system. Mobile commerce transactions similar to those set forth in sections (a) and (b) above can now be enabled.

In a similar fashion, the retailer can activate the AP or deactivate the AP so that it may not be used or attempted to be used except when desired by the retailer.

The foregoing capabilities can also be used to facilitate a dealer relationship between the MNO and the retailer. For example, the retailer could prepay (or be issued on credit) an agreed amount of prepaid wireless airtime top-up value (prepaid top-up value). For example the retailer could be issued 1.X times the retail value of such airtime, to allow for retailer profit.

The MNO thus has a "balance" associated with a given retailer account with the MNO. When a subscriber purchases airtime in the retailer's shop, the airtime is deducted from the retailer's account, and the retailer receives payment from the subscriber.

Figure 5:
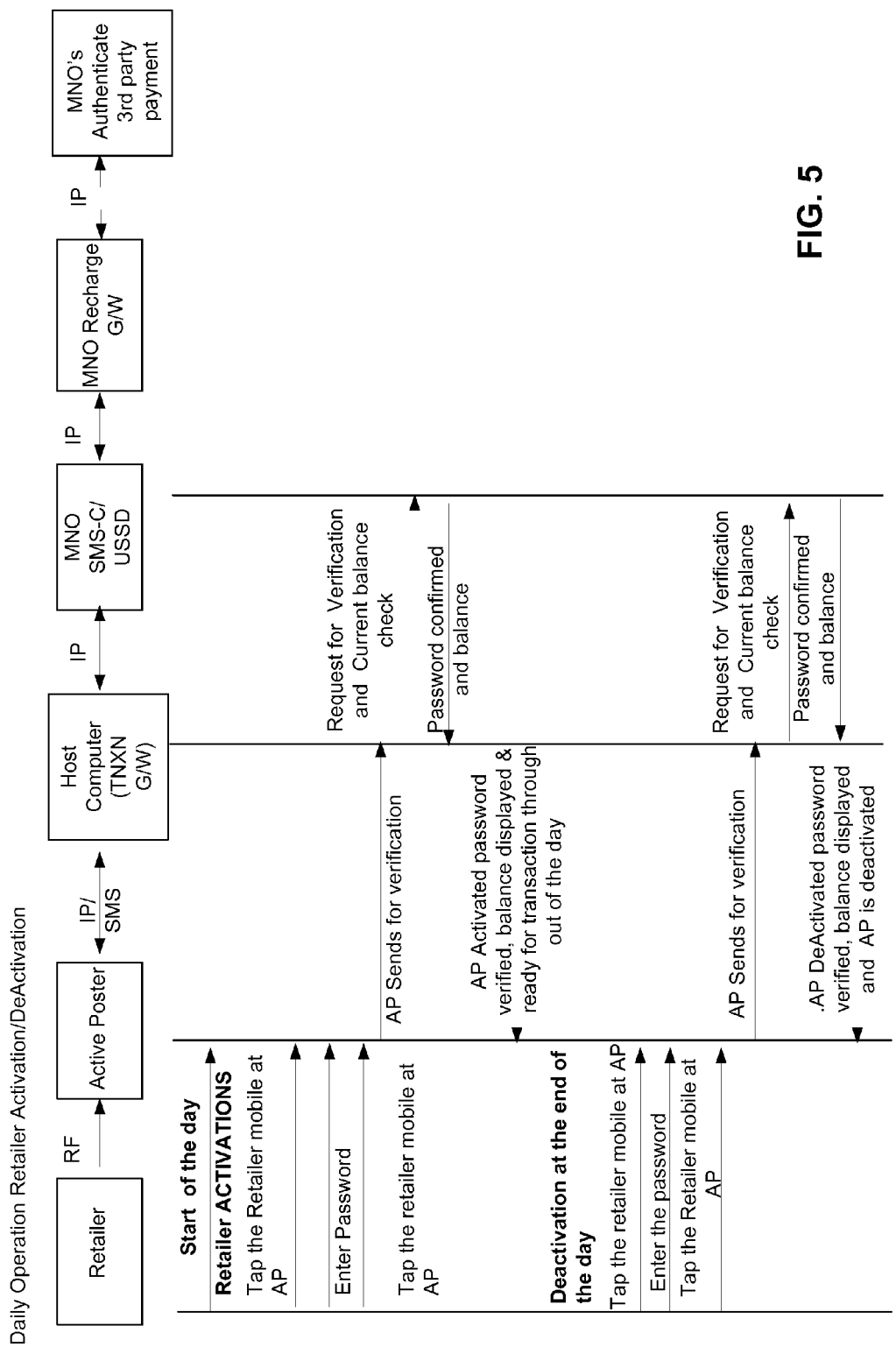
FIG. 5 is a flow diagram showing retailer's specific transactions including activate AP, Deactivate AP, Request Retailer Balance.

FIG. 5 shows Retailer Daily Activation and Deactivation and Retailer Balance Inquiry. Thus, as shown in FIG. 5, via a third transaction (the first two being activation and deactivation of the poster), the AP can, with the retailer's designated RFID with its UID which is registered as a retailer UID with the Host Computer and MNO, and after inputting a required password into the AP numerical keypad, be instructed to send a request to the Host Computer, which relays same to the MNO system, which relays the response back and causes the AP to display (via a standard numerical display which is incorporated as part of the AP), the retailer's current balance. In this way, the retailer and MNO can work together to reconcile the retailer's cash drawer with the MNO's records, each day.

d) Overall System View.

In FIG. 6, the entire set of actors and network elements is shown, with the numbered arrows showing the order of signaling in order to perform the use cases shown in Sections a, b and c above.

Conclusion.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the description.

Finally, it will be understood that the scope of this invention as described and/or illustrated herein is not limited to the specified embodiments. Those of skill will appreciate that various modifications, additions, known equivalents, and substitutions are possible without departing from the scope and spirit of the invention as set forth in the following claims.

We claim:

1. A method of facilitating a mobile commerce transaction in a system comprising:
   a wireless handheld communication device comprising a first near field communication (NFC) component comprising a device identifier corresponding to an account of a user configured to transmit said device identifier using near field communication;
   an active poster device comprising a second NFC component and at least one of a touch sensitive computer screen and a button;
   a host computer in communication with said active poster device over at least one network,
   a service provider server in communication with said host computer over the at least one network; and
   said host computer configured to have a correspondence between said device identifier and said user's account number with said service provider,
   wherein the method comprises:
      detecting proximity of said first NFC component by said second NFC component in said active poster device;
      receiving said device identifier from said first NFC component by said second NFC component in said active poster device;
      identifying a selected mobile commerce transaction by detecting a button operation or a touch on the touch sensitive computer screen of said active poster device;
      providing, by said active poster device, a transaction identification code and said device identifier, to said host computer; said transaction identification code being unique for each mobile commerce transaction;
      receiving, by said host computer, information from said active poster device, and identifying said user account with said service provider, either from records stored on said host computer or via communication with said service provider server,
      generating a unique PIN number by said host computer; said host computer providing said PIN to said subscriber and sending said PIN, device identifier and transaction amount to a retailer at the location where the user is entering into the transaction;
      receiving at said host computer an approval code and an approval message from said retailer that a payment has been received from the user;
      said host computer sending a request to said service provider to apply the payment amount in order to complete the commerce transaction, said request including said device identifier, transaction identification code, and a retailer identification number, wherein the mobile commerce transaction comprises making a payment using cash, credit card, or other payment vehicle presented at the location where the user is entering into the transaction.

2. The method of claim 1 wherein providing said PIN to said subscriber comprises said host computer forwarding said PIN to said handheld communication device via SMS.

3. The method of claim 1 wherein providing said PIN to said subscriber comprises said host computer forwarding said PIN to said active poster device in order to be provided to user.

4. The method of claim 1 wherein sending said PIN, device identifier and transaction amount to a retailer further comprises sending said PIN, device identifier and transaction amount via SMS through a mobile telecommunications network to said retailer at the location where the user is entering into the transaction.

5. A method of facilitating a mobile commerce transaction in a system comprising:

detecting the proximity of a first NFC component associated with a wireless handheld communication device having a device identifier corresponding to an account of a user by a second NFC component in an active poster device;

receiving said device identifier from said first NFC component by said second NFC component in said active poster device;

identifying a selected mobile commerce transaction by detecting a button operation or a touch on a touch sensitive computer screen of said active poster device;

providing, by said active poster device, a transaction identification code and said device identifier, to a host computer over a network; said transaction identification code being unique for each mobile commerce transaction;

receiving, by said host computer, information from said active poster device, and identifying said user account with a service provider, either from records stored on said host computer or via communication with said service provider server, generating a unique PIN number by said host computer; said host computer providing said PIN to said subscriber and sending said PIN, device identifier and transaction amount to a retailer at the location where the user is entering into the transaction;

receiving at said host computer an approval code and an approval message from said retailer that a payment has been received from the user;

said host computer sending a request to said service provider to apply the payment amount in order to complete the commerce transaction, said request including said device identifier, transaction identification code, and a retailer identification number, wherein the mobile commerce transaction comprises making a payment using cash, credit card, or other payment vehicle presented at the location where the user is entering into the transaction.

* * * * *